United States Patent [19]

Kaukeinen

[11] Patent Number: 4,923,275
[45] Date of Patent: May 8, 1990

[54] FIBER OPTIC ARRAY

[75] Inventor: Joseph Y. Kaukeinen, Rochester, N.Y.

[73] Assignee: Eastman Kodak Company, Rochester, N.Y.

[21] Appl. No.: 254,757

[22] Filed: Oct. 7, 1988

[51] Int. Cl.$^5$ ............................................. G02B 6/04
[52] U.S. Cl. ............................ 350/96.24; 350/96.22; 350/96.2
[58] Field of Search .................. 350/96.1, 96.2, 96.21, 350/96.22, 96.24, 96.25, 96.27

[56] References Cited

U.S. PATENT DOCUMENTS

| | | | |
|---|---|---|---|
| 4,364,064 | 12/1982 | Baues | 346/107 R |
| 4,389,655 | 6/1983 | Baues | 346/107 R |
| 4,495,412 | 1/1985 | Thoone et al. | 250/227 |
| 4,556,279 | 12/1985 | Shaw et al. | 350/96.15 |
| 4,590,492 | 5/1986 | Meier | 346/107 R |
| 4,720,161 | 1/1988 | Malavieille | 350/96.2 X |
| 4,723,830 | 2/1988 | Messbauer | 350/96.2 |
| 4,750,804 | 6/1988 | Osaka et al. | 350/96.22 X |
| 4,778,243 | 10/1988 | Finzel | 350/96.2 X |

FOREIGN PATENT DOCUMENTS

| | | | |
|---|---|---|---|
| 2461794 | 7/1976 | Fed. Rep. of Germany ... | 350/96.24 |
| 59-189304 | 10/1984 | Japan | 350/96.22 |
| 61-138214 | 6/1986 | Japan | 350/96.22 |
| 61-138215 | 6/1986 | Japan | 350/96.22 |
| 7416854 | 6/1975 | Netherlands | 350/96.24 |

Primary Examiner—John D. Lee
Assistant Examiner—John Ngo
Attorney, Agent, or Firm—Donald D. Schaper

[57] ABSTRACT

A fiber optic array is disclosed for use in an optical scanning device. The array includes a substrate and a plurality of optical fibers arranged on the substrate to form a linear array of the fibers. Each of the fibers is received in grooves in the substrate to precisely space the fibers relative to each other. Each fiber is adapted to receive light from a source such as a laser diode. In order to increase the packing density of the fibers in the array, the fibers are closely spaced relative to each other on the substrate. The fibers are arranged in aligned sets of grooves which are spaced apart by planar areas on the substrate, and the pitch of the grooves in successive sets decreases as the fibers approach an output end of the array to draw the fibers closer together at this end.

11 Claims, 4 Drawing Sheets

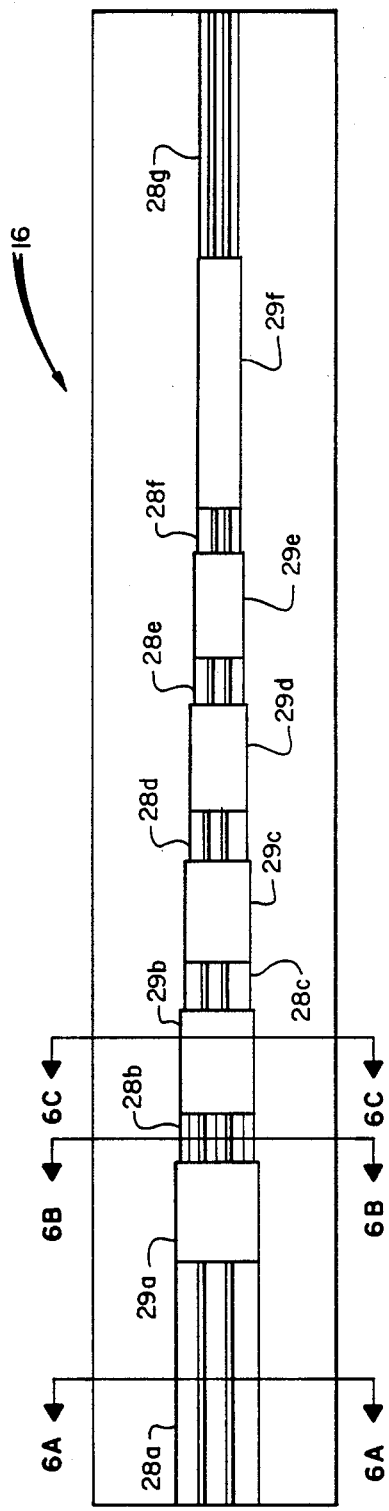
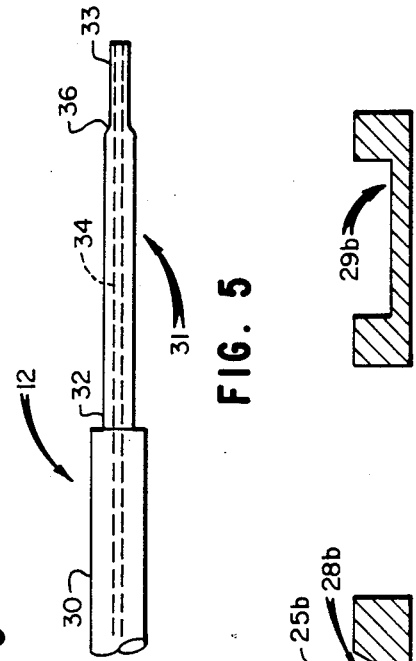
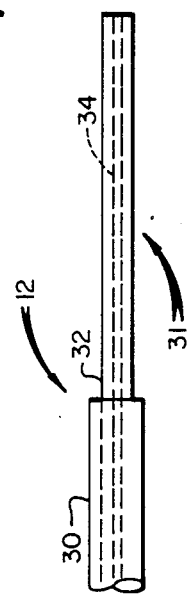
FIG. 3
FIG. 4
FIG. 5
FIG. 6A
FIG. 6B
FIG. 6C

4,923,275

FIBER OPTIC ARRAY

CROSS REFERENCE TO RELATED APPLICATIONS

Reference is made to commonly assigned U.S. patent applications, Ser. No. 254,758, entitled Method of Making A Fiber Optic Array, filed in the name of Kaukeinen et al. on even date herewith (U.S. Pat. No. 4,880,494), Ser. No. 254,759, entitled Fiber Optic Array, filed in the names of Hsu, Owens, and Sarraf, on even date herewith, and Ser. No. 254,756, entitled Method of Making a Fiber Optic Array, filed on in the names of Hsu, Rao, and Kaukeinen on even date herewith (U.S. Pat. No. 4,875,969).

BACKGROUND OF THE INVENTION

1. Field of the Invention

The present invention relates to a fiber optic array, and more particularly, to such an array which is used in an optical scanning device.

2. State of the Prior Art

It is known in the prior art to use an array of optical fibers in a print head which is used to record information on a light-sensitive recording medium. The fibers can be arranged with their output ends in a linear array extending in a direction transverse to the direction of movement of the recording medium, and a light source, such as a light-emitting diode or a diode laser, can be connected to each of the fibers at an input end. The light in each of the fibers is modulated in accordance with an information signal to produce a desired image. Focusing means can be used in front of each fiber to cause the light to be focused to a point on the recording medium. It is desirable for the arrays of optical fibers to have a high packing density, i.e., a high number of fibers per unit width of the array, in order to limit the amount of data buffering needed to produce the output image. There is a problem, however, in using increasingly thinner fibers to increase the packing density. As the fibers are made thinner, handling and alignment of the fibers becomes more difficult, and the thinner fibers are more likely to break in the assembly process.

In U.S. Pat. No. 4,389,655, there is shown an optical device or non-impact recording in which the recording head includes a linear array of optical fibers. The recording head comprises an adjustment plate having a plurality of grooves therein, and an optical fiber is secured in each of the grooves. In one embodiment of the invention, the fibers have been arranged in grooves which converge toward the output end of the array to closely space the output ends of the fibers. A problem with this arrangement is that the output ends of the fibers are not disposed at a right angle to the end of the substrate, and thus, corrective optics must be used to obtain a optimum exposure pattern on a recording medium.

SUMMARY OF THE INVENTION

It is an object of the present invention to overcome the problems in the prior art noted above and to provide an improved fiber optic array for use in scanning devices.

In accordance with one aspect of the invention, there is provided a fiber optic array comprising: a substrate which is adapted to support optical fibers on a surface thereof, the substrate having a plurality of grooves on the surface, the grooves being arranged in sets, the sets of grooves being separated from each other by areas of the surface and being arranged to receive fibers supported on said substrate; and a plurality of fibers in the grooves.

The fiber optic array of the present invention includes an array of optical fibers supported in grooves formed in a substrate. The grooves are arranged in aligned sets, and each set of grooves is separated by planar areas on the substrate which are coplanar with the bottoms of the grooves. At an input end of the substrate is a set of grooves which are sized to receive the jackets of the optical fibers, and sets of grooves, which are adapted to receive the cladding of the fibers, are spaced along the substrate to an output end of the substrate. The pitch of the grooves in successive sets decreases as the fibers approach the output end of the substrate in order to draw the fibers closer together at the output end. In one embodiment of the present invention, sets of closely spaced V-shaped grooves are etched in a silicon substrate, and an optical fiber having a cladding portion of reduced diameter is inserted in each of the grooves to form a linear array of fibers. An adhesive is used to secure the fibers in the grooves.

A principal advantage of the array of the present invention is that the optical fibers can be supported on the substrate in close proximity to each other in a manner which does not damage the fibers or affect the performance of the fibers. As a result of supporting the fibers in sets of grooves separated by planar areas, the fibers can be placed in grooves of increasingly smaller pitch without being forced through sharp turns which would damage the fibers. Further, the planar areas between the grooves facilitate the cementing of the fibers in the grooves.

A further advantage of the array of the present invention is that a very high packing density is obtained as a result of using fibers in which the cladding diameter at one end is relatively small. Moreover, the fibers are constructed such that they have the strength and rigidity to be handled in the same manner as fibers which do not have ends of reduced diameter. Outputs from the closely-spaced and independently-addressable fibers can be imaged onto a receiving medium through a single train of optics with diffraction-limited performance.

Other features and advantages will become apparent with reference to the following Description of the Preferred Embodiments when read in light of the attached drawings.

BRIEF DESCRIPTION OF THE DRAWINGS

FIG. 3 is a plan view of the substrate used in the present invention;

FIG. 4 is a view of a fiber which has been prepared for etching:

FIG. 5 is a view of a fiber after etching;

FIG. 6A–6C are sectional views taken along the lines 6A—6A, 6B—6B, and 6C and 6C, respectively, in FIG. 3.

DESCRIPTION OF THE PREFERRED EMBODIMENT

Figure 1:
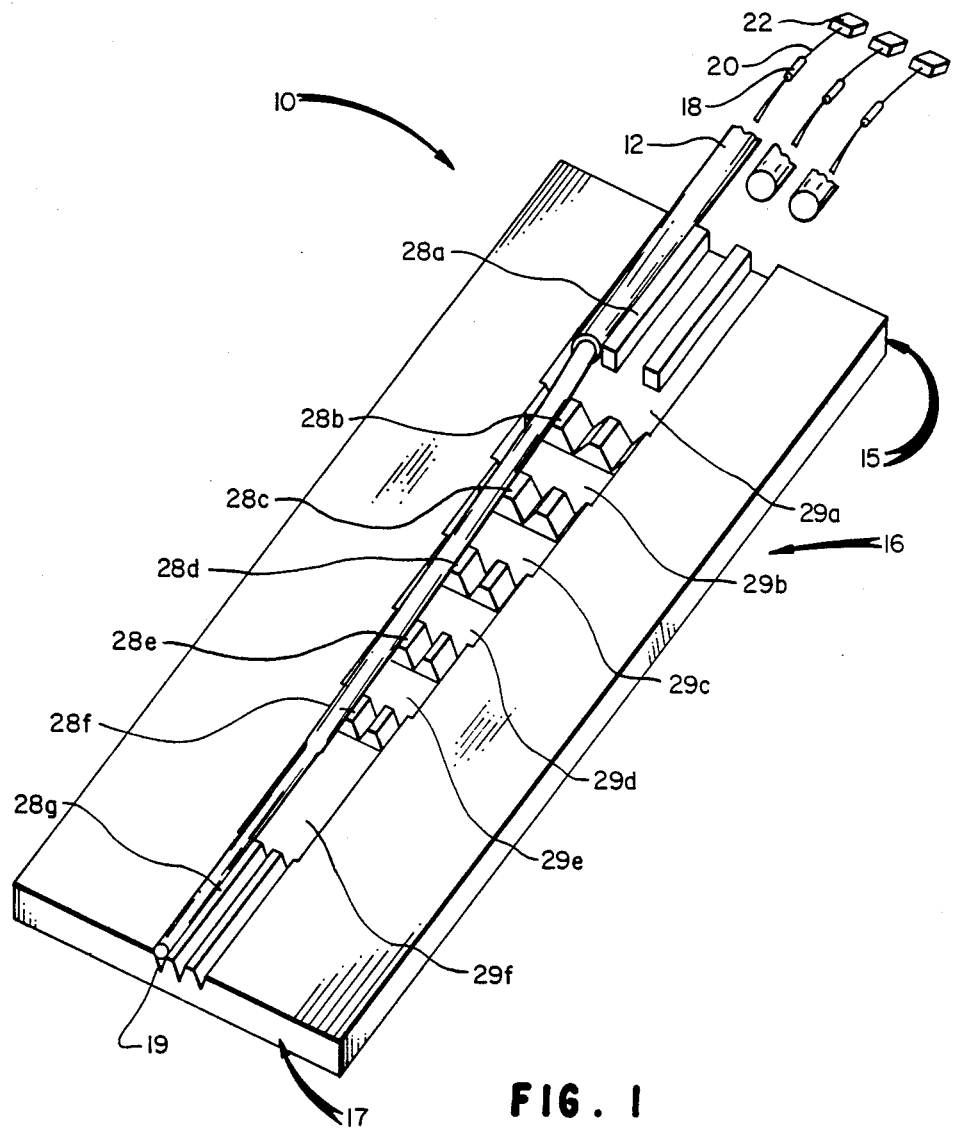
FIG. 1 is a perspective view of one embodiment of the present invention.

With reference to FIG. 1, there is shown a fiber optic array 10 constructed in accordance with the present invention. Fiber optic array 10 comprises three optical fibers 12 which are supported on a substrate 16. The full length of only one of the fibers 12 is shown in order to more clearly illustrate various features of the invention; it will be understood, however, that each of the fibers 12 is identical and extends the full length of substrate 16. Each of the fibers 12 is connected by means of an optical fiber connector 18 to another optical fiber 20. Optical fiber connector 18 can be of the type shown in commonly-assigned U.S. Pat. No. 4,723,830, entitled Optical Fiber Connectors, issued Feb. 9, 1988. Each optical fiber 20 is connected to a light source 22, such as a diode laser or a light-emitting diode. Each light source 22 in array 10 can be modulated according to an information signal in a well-known manner. Array 10 can be used to record information on a light-sensitive medium (not shown) such as a photoconductor or photographic film. Array 10 can also be used as an optical scanner (not shown) in which light reflected from an object is transmitted through the optical fibers to photosensitive elements.

As shown in FIGS. 4 and 5, each of the optical fibers 12 includes a jacket 30, a cladding 32, and a core 34. Jacket 30 has been removed from an end 31 of the fiber 12 to expose the cladding 32, and in a cladding portion 33 (FIG. 5), the diameter of the cladding is substantially reduced so that the portions 33 can be more closely spaced relative to each other. A tapered cladding portion 36 is formed at one end of portion 33. A fiber suitable for use in the present invention is a special single-mode fiber made by Corning Glass Works, Fiber No. 56704121,KH1. This fiber is made of silica with germanium doping in the core 34. The jacket 30 has a diameter of 250 $\mu$m, the cladding 32 has a diameter of 125 $\mu$m, and the core 34 has a diameter of 4 $\mu$m.

Although the invention herein is described using optical fibers having ends of reduced diameter, the array of the present invention can also utilize fibers in which the diameter of the cladding is the same throughout the length of the fiber.

As shown in FIG. 1, fibers 12 extend from an input end 15 of array 10 which supports jackets 30 of the fibers to an output end 17 of the array, and the fibers 12 are closest together at end 17. Fibers 12 are mounted in sets of grooves 28a–28g which are formed in substrate 16 and are separated by planar areas 29a–29f in the substrate 16. Grooves 28a–28g in each set are separated by lands 25a–25g, respectively. Grooves 28a are generally rectangular in cross section, as shown in FIG. 6A, and grooves 28b–28g are generally V-shaped in cross section as shown in FIG. 6B. In a preferred embodiment, the areas 29a–29f are coplanar with the the groove tips or bottoms of adjacent grooves; one of the groove tips is shown at 27b in FIG. 6B.

Figure 2:
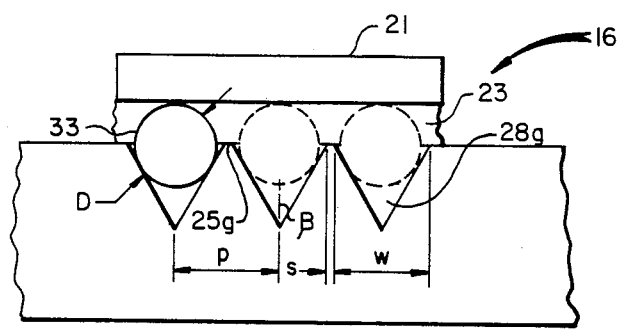
FIG. 2 is an enlarged elevational view of a portion of one end of an array showing the spacing of the grooves and the location of an optical fiber in a groove.

As shown in FIG. 2, a glass plate 21 extends over the fibers 12 in grooves 28g, and a similar plate (not shown) extends over the fibers 12 at each of the other sets of grooves 28a–28f. These glass plates are very essential in the fabrication of array 10 as will be explained hereinafter. The glass plates 21 have been omitted in FIG. 1 in order to more clearly show elements of the present invention. At each set of grooves 28a–28g, a plate 21 extends over the fibers 12 and the grooves, and as shown in FIG. 2, an epoxy 23 fills the void areas between the plate 21, the substrate 16 and the fibers 12.

Grooves 28a–28g are arranged to space fibers 12 progressively closer together in the direction of output end 17 of the array 10. The progressively closer spacing is accomplished by decreasing the pitch p (FIG. 6B) of the grooves in successive sets of grooves 28a–28g. As shown in FIG. 6B, the pitch p of the grooves includes the width W of the grooves and width S of the lands 25a–25g. The pitch p can be changed by changing the width S of the land, or by changing the width W of the grooves, or by changing both S and W.

Grooves 28a are sized to receive the jackets 30 of fibers 12. Grooves 28b–28f are adapted to receive the cladding 32 of the fibers 12, and grooves 28g are adapted to receive the cladding portions 33 of reduced diameter. It is important that the jackets 30 remain on fibers 12 on substrate 16 for a certain length of the fibers to lend stability to array 10. In some embodiments, it may be desirable for the cladding portion 33 to extend into other sets of the grooves 28b–28f. The dimensions of the grooves 28a 28g will depend on the size and type of fiber used in array 10. For a single mode fiber of the type described above, obtainable from Corning Glass Works, the grooves 28a are from about 255 to about 280 $\mu$m wide, and grooves 28b–28f are about 155 $\mu$m wide; the dimensions of grooves 28g for various sizes of cladding portion 33 are given in Table I which follows. Starting with grooves 28b and progressing through successive sets of to grooves 28g, the grooves 28b–28g are separated by lands 25b–25g having progressively thinner widths S in order to draw the fibers 12 closer together at end 17 of the array 10. For example, the widths S of the lands 25a–25g can be, respectively, 25, 100, 76, 53, 29, 5, and 4 $\mu$m.

In one illustrative example of the present invention, the length of the substrate 16 is about 75 mm, the width of the substrate is about 25 mm, and the substrate is about 525 $\mu$m thick. The length of the grooves 28a is about 10 mm, the length of grooves 28b–28f is about 2 mm, and the length of grooves 28g is about 25 mm. The length of planar areas 29a–29e is about 4 mm, and the length of planar area 29f is about 10 mm.

The dimensions of grooves 28g and of portions 33 of fibers 12 are indicated in FIG. 2 where W is the width of a groove 28g, $\beta$ is the half angle of a groove 28g, S is the width of the land 25a between adjacent grooves 28g, and P is the channel separation, that is the distance between the grooves 28g at the bottoms 27g thereof. D is the diameter of cladding portion 33 of a fiber 12. The angle $\beta$ is about 35° when the grooves 28g are etched in silicon; however, other angles can be used. The dimensions of grooves 28g for various diameters D are shown in Table I.

TABLE I

| D($\mu$m) | W($\mu$m) | S($\mu$m) | P($\mu$m) |
|---|---|---|---|
| 10 | 12 | 4 | 16 |
| 20 | 24 | 4 | 28 |
| 30 | 36 | 4 | 40 |
| 40 | 49 | 4 | 53 |
| 50 | 61 | 4 | 65 |
| 100 | 146 | 4 | 150 |

Fiber Etching

In FIG. 4, there is shown a fiber 12 in which the jacket 30 has been removed from a portion thereof in preparation For an etching step. Fiber 12 is etched in hydrofluoric acid (HF) in order to reduce the diameter of cladding 32 from, for example, 125 μm to a diameter as small as 10 μm. The nominal etching rate at room temperature is 1.00 μm/min. The diameter of portion 33 must be large enough so there is no coupling of light between adjacent fibers. For best results, the diameter of the cladding in portion 33 should be at least 10 μm.

A fiber 12, after etching, is shown in FIG. 5. During the etching process, the ends of fibers 12 are placed in the hydrofluoric acid, and the tapered portion 36 is formed above the surface of the HF acid as a result of capillary action. It has been found that the tapered portion 36 has a beneficial effect in that the bending strength of the fiber 12 is substantially greater than it would be if there were a sharp change from the normal diameter of cladding 32 to the cladding portion 33 of reduced diameter. The core 34 of fiber 12 is etched aster than the cladding 34; as a result, a concave tip (not shown) is formed on core 34 which must be removed by polishing after the etching step.

Substrate Preparation

Figure 7:
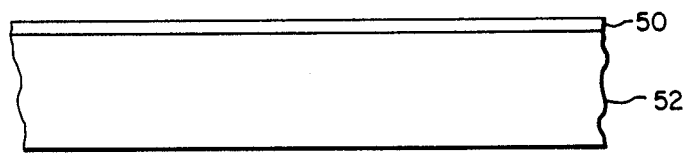
FIGS. 7–13 are views showing the sequence of steps for forming grooves in the substrate.
Figure 8:
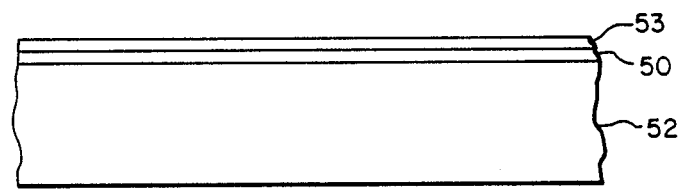
Figure 9:
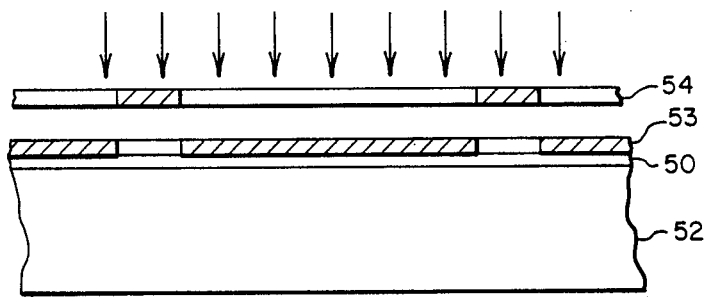
Figure 10:
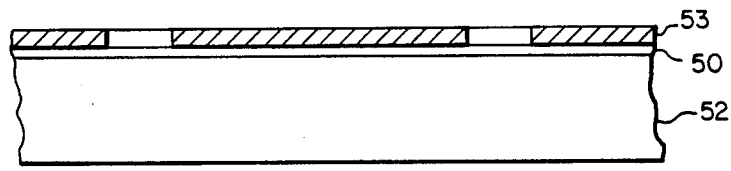
Figure 11:
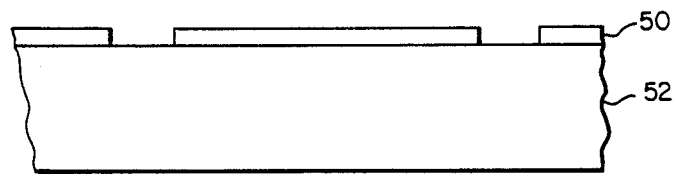
Figure 12:
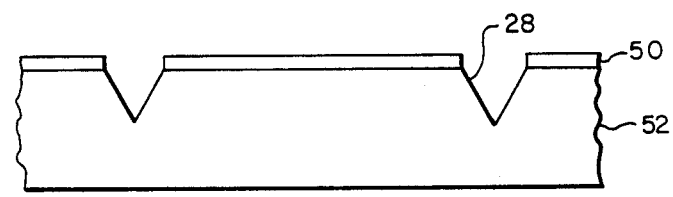
Figure 13:
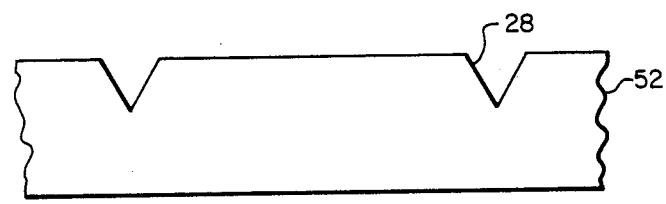

The substrate 16 is preferably formed from a silicon wafer (not shown) by photolithographic means. With reference to FIGS. 7-13, there are shown the steps for forming the grooves 28b-28g and planar areas 29a-29f in the wafer. As shown in FIG. 7, a layer 50 of $Si_3N_4$ is formed on a silicon wafer 52, and as shown in FIG. 8, a negative photoresist 53 is formed over the $Si_3N_4$ layer 50. The negative photoresist 53 can be, for example, photopolymerizable plastic such as negative photoresist, type 747, supplied by KTI Chemical, Inc. photoresist 53 is exposed with ultraviolet light through a mask 54 (FIG. 9). The ultraviolet light can be provided by mercury vapor lamps. In the next step, the photoresist is developed, using, for example, projection Developer obtainable from KTI Chemical, Inc., to remove the unexposed portions of photoresist, as shown in FIG. 10. Next, the $Si_3N_4$ layer 50 is etched, using plasma etching, and the photoresist 53 is stripped, as shown in FIG. 11. The exposed portions of wafer 52 are then etched to form the grooves 28a 28g, indicated at 28 in FIG. 12, and the planar areas 29a-29f of substrate 16. After the grooves and planar areas are formed, the $Si_3N_4$ layer 50 is removed by plasma etching, and the wafer 52 appears as shown in FIG. 13. It has been found that removal of the $Si_3N_4$ layer 50 is a very important step, since the adhesive used to cement the fibers 12 in the grooves does not adhere well to the $Si_3N_4$ under all conditions. The wafer 52 is cleaned before and after etching using acetone and deionized water, and the wafer is then blown dry with nitrogen.

The process described above is used to form grooves 28b-28g and planar areas 29a-29f in substrate 16. Grooves 28a at end 15 of the substrate 16 are formed last, and they are formed with a diamond blade. Grooves 28a are adapted to receive the jackets 30 of the fibers 12. In one illustrative example, the grooves 28a, as shown in FIG. 6A are generally rectangular in cross section; and the width W is between about 255 and about 280 μm, the depth d is about 150 μm, and the width S of the lands 25a is about 25 μm.

Great care must be used in the mounting of fibers 12 on substrate 16 due the fragility and relatively small size of the fibers 12. In a first step, the fibers are arranged parallel to each other in a holder (not shown) having channels to receive the jackets 30. The jackets 30 of the aligned fibers 30 are then inserted In the grooves 28a on substrate 16. A glass plate, for example, a plate such as plate 21 shown in FIG. 2, is placed over the jackets 30 in grooves 28a. The glass plate can be about 150 μm thick and should be of a size to extend over grooves 28a. The glass plate is held in place by a needle in a micropositioner, model 221, obtainable from Rucker and Kolls. An ultraviolet light curable epoxy is introduced between the glass plate and substrate 16, and the epoxy is drawn into grooves 28a around the jackets 30 of fibers 12 by means of capillary action. The epoxy is cured by ultraviolet light which is directed onto epoxy through the glass plate. The cladding 32 of fibers 12 is then eased into grooves 28b-28g of progressively finer pitch, and the fibers 12 are cemented in place in each set of grooves 28b-28g by means of a glass plate and UV curable epoxy as described previously; that is, the glass plate is placed directly over the fibers 12 in the grooves, held in position by a micropositioner, and UV curable epoxy is introduced around the fibers 12 in the grooves by means of capillary action.

The planar areas 29a-29f provide an area in which the fibers 12 are drawn closer together between the sets of generally parallel grooves 28b-28g of progressively smaller pitch. The planar areas 29a-29f are also important in the assembly steps just described in that they provide a means for viewing the fibers to determine if the fibers are actually aligned, since it is very difficult to see the fibers in the sets of grooves 28b-28g.

When the fibers 12 have been cemented in grooves 28a 28g, a portion of the array facet 19 is removed by means of a dicing saw (not shown), and the facet 19 is then polished. The dicing saw can be a resin impregnated diamond blade, and the dicing step can be accomplished by cutting through the glass plate covering cladding portions 33, optical fibers 12 and the substrate 16 simultaneously.

An important element of the present invention is the adhesive used to cement the fibers 12 to the substrate 16. The adhesive must have low viscosity for good capillary action and a lower refractive index than that of the cladding 32 to minimize radiation loss and cross talk between fibers 12. After the adhesive has cured, there should be low stress on the fiber to minimize micro bending loss, and the adhesive should have adequate hardness to insure a polished surface of high quality. A suitable adhesive is Norland 61 adhesive which can be obtained from the Norland Co. However, a preferred adhesive is Lamdek U V Adhesive, Catalog No. 177 6921, which can be obtained from Dymax Engineering Adhesives, a division of the American Chemical and Engineering Co., Torrington, CT.

In an illustrative example of the present invention, an array 10 was formed from single mode fibers having a core diameter of about 4 μm and a cladding diameter of about 125 μm. The portions 33 were etched to a diameter of about 15 μm, the length of portions 33 was about 25 mm, and the channel separation (P) between grooves 28g on substrate 16 Was about 28 μm. The fibers 12 were mounted on a substrate 16 as shown in FIG. 1. The array thus formed was evaluated for taper/packaging loss, cross talk level, and the output beam quality. The taper/packaging loss is an indication of the radiation loss due to fiber taper, to etched cladding, and to packaging stress in comparison to the radiation loss due to these factors from a single mode fiber which has not been etched. It was found that the propagation characteristics of the optical field were changed very little due to the etching and packaging processes. Thus a substantial increase in packing density has been achieved in the array of the present invention while maintaining the necessary efficiency of the fibers.

It will be apparent that the number and spacing of fibers 12 can be changed to meet the needs of a particular application. An array (not shown) could extend the full length of a recording medium, or a recording head (not shown) could include a plurality of arrays arranged side-by-side or in parallel rows. An array 10 can also be used to produce various print formats, as shown, for example, in a commonly-assigned patent application entitled Method of Scanning an Image, U.S. Ser. No. 254,745 filed in the name of D. Haas on even date herewith.

The invention has been described in detail with particular reference to a preferred embodiment thereof, but it will be understood that variations and modifications can be effected within the spirit and scope of the invention.

I claim:

1. A fiber optic array comprising:

a substrate which is adapted to support optical fibers on a surface thereof, said substrate having sets of grooves on said surface for receiving optical fibers therein, the grooves in each of said sets being generally parallel and the grooves in all of the sets extending in generally the same direction, said sets of grooves being spaced along said substrate from one end to an opposite end thereof and said sets of grooves being separated from each other by generally planar areas of said surface which are generally coplanar with bottoms of said grooves, the pitch of the grooves in each set being less than the preceding set in the direction of said opposite end; and a plurality of fibers in said grooves, said fibers being arranged side-by-side on said substrate, said fibers converging toward said opposite end and having ends at said opposite end which form a generally linear array of closely spaced fiber ends.

2. A fiber optic array, as defined in claim 1, wherein a planar element is disposed over each set of grooves and the fibers therein.

3. A fiber optic array, as defined in claim 1, wherein each of said grooves at said opposite end has a maximum width of between about 12 $\mu$m and about 46 $\mu$m.

4. A fiber optic array, as defined in claim 1, wherein at least some of said grooves are generally V-shaped.

5. A fiber optic array, as defined in claim 1, wherein each of said fibers has a core and a cladding around said core, and an outside dimension of said cladding is less in a first portion than in a second portions thereof.

6. A fiber optic array, as defined in claim 5, wherein the cladding of said fibers has a generally circular cross section, and said outside dimension of the cladding is the diameter thereof.

7. A fiber optic array, as defined in claim 6, wherein the cladding of each of said fibers includes a tapered portion and said tapered portion is supported on one of said areas.

8. A fiber optic array, as defined in claim 5, wherein said cladding diameter in said first portion is between about 10 $\mu$m and about 100 $\mu$m.

9. A fiber optic array, as defined in claim 1, wherein each of the fibers has a portion which has a jacket thereon and a portion in which the cladding is exposed.

10. A fiber optic array, as defined in claim 9, wherein said substrate includes grooves for receiving the jackets of the fibers.

11. A fiber optic array, as defined in claim 1, wherein there are at least three sets of grooves on said surface.

* * * * *

UNITED STATES PATENT AND TRADEMARK OFFICE
CERTIFICATE OF CORRECTION

PATENT NO. : 4,923,275
DATED : May 8, 1990
INVENTOR(S) : Joseph Y. Kaukeinen

It is certified that error appears in the above-identified patent and that said Letters Patent is hereby corrected as shown below:

Column 1, line 45, "or" should read --for--.
Column 4, line 22, "28a 28g" should read --28a-28g--.
Column 5, line 1, "For" should read --for--; line 18, "aster" should read --faster--; line 33, "Inc. photore-" should read -- Inc. Photore- --; line 37, "projection" should read --Projection--; and line 43, "28a 28g" should read --28a-28g--.
Column 6, line 1, "In" should read --in--; line 31, "28a 28g" should read --28a-28g--; line 59, "Was" should read --was--; and line 62, "cross talk" should read --cross-talk--.
Column 7, line 1, after "Thus", insert --,-- (comma).
Column 8, line 17, "portions" should read --portion--.

Signed and Sealed this

Twenty-third Day of July, 1991

Attest:

HARRY F. MANBECK, JR.

Attesting Officer

Commissioner of Patents and Trademarks